United States Patent [19]

Holmberg et al.

[11] 3,963,810

[45] June 15, 1976

[54] CONTACT BODY FOR COOLING TOWERS

[75] Inventors: Roy Holmberg; Ove Strindehag, both of Jonkoping, Sweden

[73] Assignee: Aktiebolaget Svenska Flaktfabriken, Nacka, Sweden

[22] Filed: Dec. 16, 1974

[21] Appl. No.: 533,227

[30] Foreign Application Priority Data

Dec. 20, 1973 Sweden............................ 7317317

[52] U.S. Cl................................ 261/112; 428/183
[51] Int. Cl.$^2$....................................... B01D 47/00
[58] Field of Search.................. 261/112, DIG. 11; 428/183

[56] References Cited
UNITED STATES PATENTS

| | | | |
|---|---|---|---|
| 3,286,999 | 11/1966 | Takeda............................ | 261/112 |
| 3,415,502 | 12/1968 | Munters........................... | 261/112 |
| 3,540,702 | 11/1970 | Uyama............................. | 261/112 |
| 3,618,778 | 11/1971 | Benton............................. | 261/112 |
| 3,733,063 | 5/1973 | Loetel et al..................... | 261/112 |
| 3,792,841 | 2/1974 | Munters........................... | 261/112 |

*Primary Examiner*—Tim R. Miles
*Assistant Examiner*—Gregory N. Clements
*Attorney, Agent, or Firm*—Dorfman, Herrell and Skillman

[57] ABSTRACT

A contact body comprising a sheet of material adapted to be positioned upright on edge within a cooling tower along with a plurality of similar bodies. Water is caused to flow downwardly upon the surfaces of said body, in the preferred embodiment countercurrent to the flow of air through the tower. A fine surface structure on the body consists of corrugations or folds disposed at an angle to the vertical between 65° and 88°. The corrugations have a wave length below 12 mm and an amplitude between 1 and 5 mm. The corrugations are arranged in fields whose angles of inclination alternate successively between positive and negative inclination. The fields may range between 20 and 50 mm and alternate along the vertical extent of the body. They may also alternate along the horizontal extent of the body. Integral spacer elements are pressed out of the body to position adjacent vertical bodies in spaced, generally parallel arrangement. The structure of the body may also be undulating to increase the surface area exposed to the air flow.

11 Claims, 12 Drawing Figures

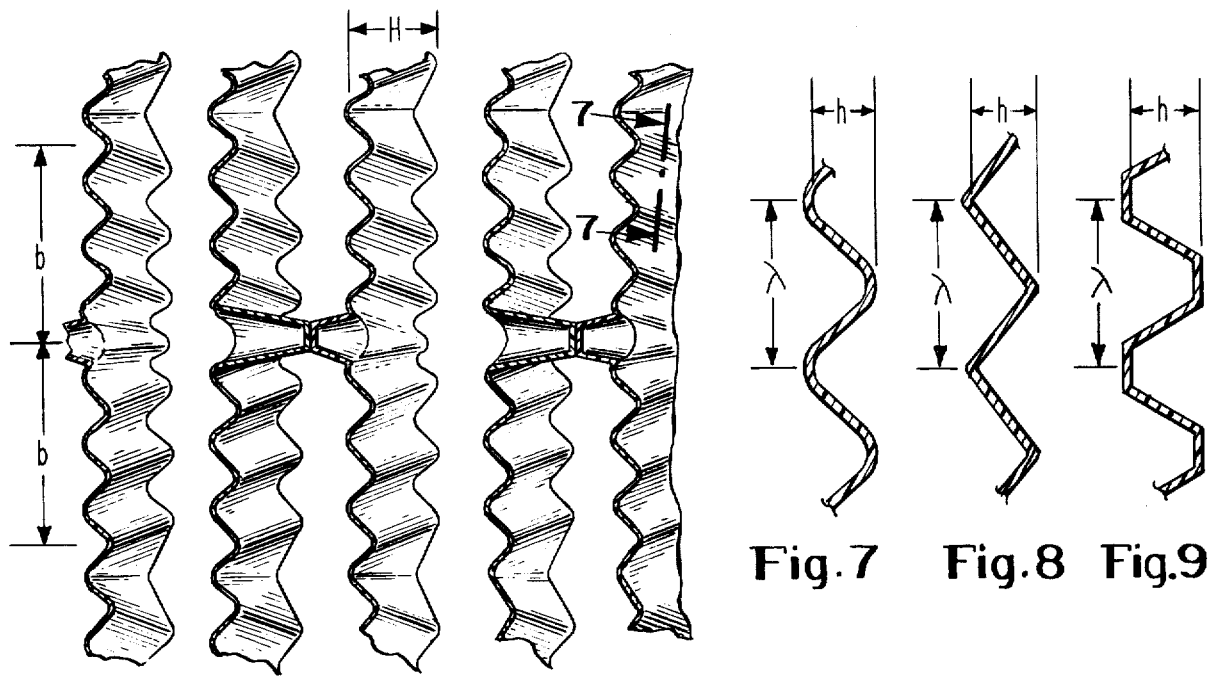
Fig. 6  Fig. 7  Fig. 8  Fig. 9
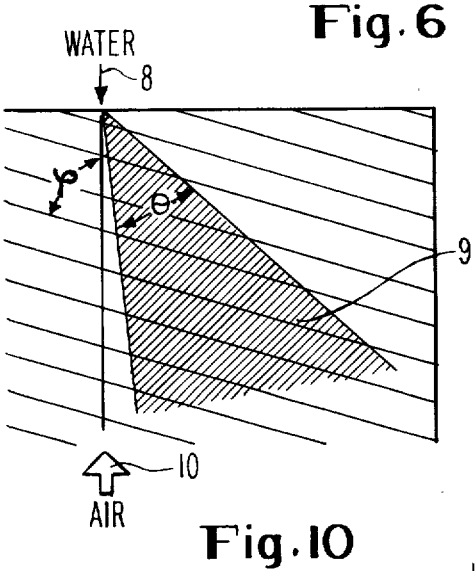
Fig. 10
Fig. 11
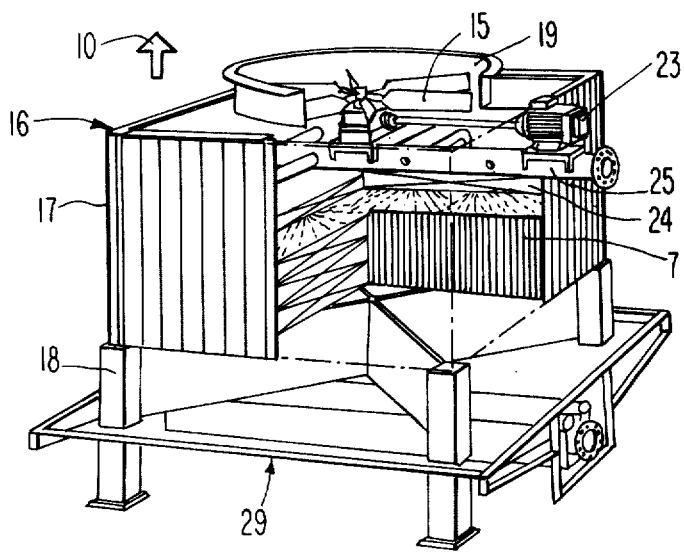
Fig. 12

CONTACT BODY FOR COOLING TOWERS

This invention relates to a contact body for water and air intended primarily for cooling towers and air humidifiers and comprising a plurality of contact plates, which stand vertically in parallel and are provided with folds or corrugations to constitute a so-called fine structure with a fold height between 1 and 5 mm and a wave length of the folds shorter than 12 mm. In cooling towers of conventional design, the water to be cooled is distributed over a contact body in the tower by means of some sprinkler device, for example a number of nozzles disposed at the tower top, whereafter the water passes downwards in the tower whilst being permanently in contact with the cooling air flowing into the tower at its bottom or sides. In order to establish good thermal contact between the water and the air, i.e. to obtain a high cooling effect, it is important that the water adheres to the contact body surfaces on as large a part thereof as possible. The contact body, of course, must have a large contact area per volume unit to permit a compact design of the cooling tower.

The contact body often consists of corrugated plates or foils of e.g. metal, plastics or impregnated cardboard, which are mounted with spaced relationship to form passageways of a size suitable to permit the water and air streams to pass through the contact body. Irrespective of the material chosen, it is difficult to provide a good adherence and a uniform water distribution over the plates in the contact body, specially at low water amounts. It was tried to overcome this disadvantage by providing the contact plates with a fine structure of some kind, for example in the form of small elevations and depressions arranged to some pattern in the surfaces of the plates, but this did not bring about satisfactory results, either.

The object of the present invention is to overcome the aforesaid disadvantages and to produce a contact body showing such a fine structure that optimum water distribution in combination with good adherence to the contact plate is obtained. Optimum water distribution in this conjunction is to be understood so that water flowing out in the form of a narrow runnel at the upper edge of a contact plate expands or propogates to the greatest possible extent before it arrives at the lower edge of the plate.

This object is achieved according to the invention by an embodiment of the contact body having oppositely-inclined folds or corrugations, whereby a good adhesion to the contact plate is obtained and also a possible oblique distribution of the water flow can be balanced. This latter property is very important, because it is seldom possible to effect a uniform water distribution over the cross-section of the contact body with the sprinkler members utilized in practice at the top of the cooling tower.

The invention is based on the insight that for achieving optimum water distribution the surface tension force acting on the liquid is required to be in close agreement with the gravity acting on the liquid. The inclination, shape and height of the folds must be in a definite relation to each other for obtaining optimum water distribution, as will be shown later on. Furthermore, in order to achieve the effect in question, the area of the contact plate must be divided into fields in the vertical extension of the plate, in such a manner, that the folds in subsequent fields incline in opposed directions to the vertical plane and thereby effect a redistribution of the water flow so as to be spaced uniformly along the plate.

Preferred alternative embodiments of the contact body are also set forth.

The invention is intended for use primarily in cooling towers with the water and air streams passing in a countercurrent flow, i.e. the cooling air flows upwards in the contact body. As will be evident from the following, the invention is also applicable in cooling towers operating after the cross-current principle, i.e. the cooling air flows horizontally through the contact body, and in air humidifiers of so-called insert type. These air humidifiers operate in the same manner as cooling towers of cross-current type, but normally the water flow through the contact body is substantially smaller than in the case of cooling towers.

The invention is described in the following in greater detail, with reference to the Figures in the drawings, of which:

FIG. 6 is a transverse sectional view through the body shown in FIG. 5;

FIG. 7 is an enlarged perspective view showing the fine structure of the surface as indicated by the line 7—7 of FIG. 6;

FIGS. 8 and 9 are enlarged sectional views similar to FIG. 7 showing alternate forms of fine structure;

FIG. 10 is a face view of a contact body illustrating the angle of propogation;

FIG. 11 is a view similar to FIGS. 2 and 3 showing a further modification in the arrangement of the fine structure; and FIG. 12 is a perspective view of a cooling tower embodying a contact body of the present invention with portions broken away to illustrate the interior components thereof.

Figure 1:
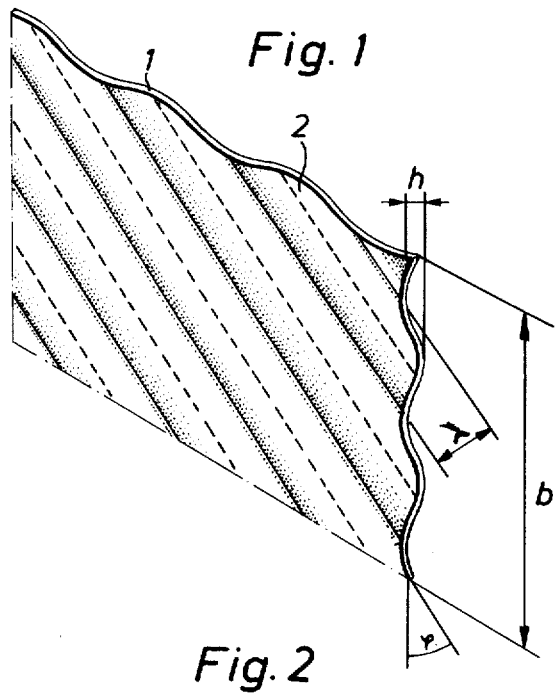
FIG. 1 is a fragmentary perspective view showing the fine structure at a part of a contact plate.
Figure 4:
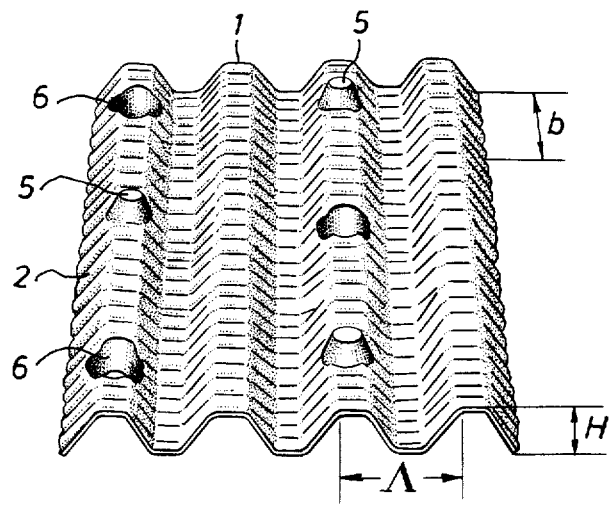
FIG. 4 shows in a perspective way a contact plate, at which the fine structure is applied on a plate having a base structure.

In FIG. 1 the numeral 1 designates a contact plate provided with a fine structure. In this case, the fine structure is a coherent sequence of sinusoidal-shaped folds 2 covering the entire field. The amplitude or height (h) and wave length ($\lambda$) of these folds may in the sinusoidal-shaped perferably be 2.5 mm and, respectively, 7 mm, and the inclination to the vertical plane ($\phi$) may be between 65° and 88° and preferably between 75° and 85°. The height (h) of the folds is to be understood as the distance between wave trough and wave crest on the side of the plate, i.e. the thickness of the plate is not included in this distance. At the inclination, height and form of the illustrated fine structure, the water flow supplied in the form of a narrow runnel at the upper edge of the contact plate is broadened substantially as illustrated in FIG. 10. The width (b) of the field with fine structure shown may be chosen to be preferably 20–50 mm, depending on the size of the plate. Below the first field in the vertical direction of the contact plate, a next field follows with folds inclined in the opposed direction. In this way an alternating change in the direction and a perpetual redistribution and widening of the water flow on the contact plate are obtained. A fine structure may be chosen which, instead of folds of sinusoidal shape, comprises folds of, for example, triangular or trapezoidal shape, as shown in FIGS. 8 and 9. The shape of the folds affects, however, as already mentioned, the height and inclination to be chosen for achieving optimum water distribution, because the surface tension force strongly depends on the radii of curvature of the folds. In the table below some values for the propagation angle ($\theta$) (See FIG. 10) of the water are shown which were obtained by experiments as a function of the angle ($\phi$) of the folds to the vertical plane on a contact plate with substantially sinusoidal-shaped folds of the height 2.5 mm. In FIG. 10, a rivulet of water, introduced as indicated by the arrow at 8, spreads out over an area within the angle $\theta$ indicated by shading at 9, under the influence of upwardly flowing air as indicated at 10. The water flow on the contact plate at the measuring occasion corresponded to a value typical for contact plates in cooling towers.

base structure, but may also be superimposed on plates having a base structure of some different configuration, for example on plates with sinusoidal-shaped, triangular or trapezoidal corrugation. A trapezoidal base structure is shown in FIG. 4 where the fine structure is applied on a plate having a base structure 3. The corrugation height (H) of the structure for cooling towers usually is 10–30 mm. The wave length ($\Lambda$) the base structure is usually in the range of 20–50 mm, and the corrugations are substantially vertical. The folds of the fine structure are indicated by 2, and the width of a field having the same inclination of the folds is marked in the Figure by $b$. It is to be observed that the desired distribution and direction of the water are not obtained with a contact plate having only a base structure and no fine structure, because the surface tension forces then will not be sufficiently active in view of the large radii of curvature of the base structure. Moreover, as the propagation of the water on the contact plate also depends on the total effect obtained from a number of folds, the contribution from the base structure, having only a few folds per length unit, is considerably smaller than the contribution from the fine structure.

The contact plate according to FIG. 4 is provided also with a plurality of spacer members 5 forming a

| Angle to the vertical plane $\phi°$ | 45 50 55 60 65 70 75 80 85 90 |
|---|---|
| Propagation angle of the water $\theta°$ | 7 9 13 16 19 24 55 65 58 6 |

As appears from the measuring results, at the fold height and shape in question an angle of at least 65° to 88° and preferably 75°–85° to the vertical plane is to be chosen.

Figure 2:
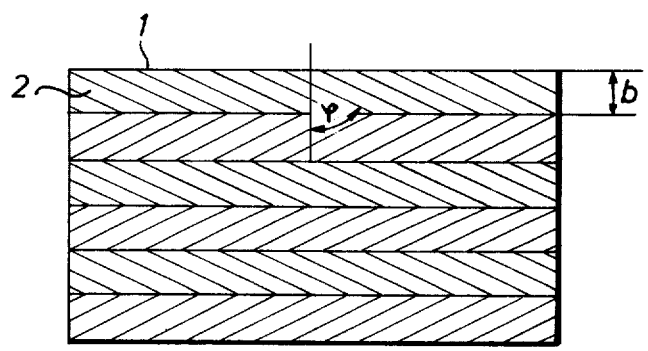
FIG. 2 shows in a schematic way a contact plate, at which the fine structure is divided into fields in vertical direction, and diagrammatically illustrating the inclination angle.

In FIG. 2 a contact plate is shown which along its extension in vertical direction shows a second field, where the folds of the fine structure for two adjacent fields have opposite inclination to the vertical plane. The width (b) of the field preferably is chosen 20–50 mm.

Figure 3:
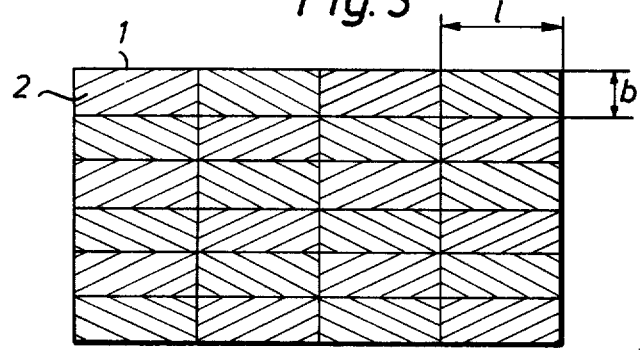
FIG. 3 shows in a schematic way a contact plate, at which the fine structure is divided into fields in vertical and horizontal direction.

In FIG. 3 the fine structure forms in addition to fields in vertical direction, as in FIG. 2, also fields in horizontal direction. The fields have here the same width as in FIG. 2, and the length (1) can be chosen suitably, depending on the total length of the contact plate. The fine structure can be applied on a contact plate, of course, also in several ways other than those shown in FIGS. 2 and 3. Between the respective fields, for example, portions of the contact plate may be left free of any fine structure, as shown in FIG. 11. In FIG. 10, the fields 12 and 13 having oppositely-directed corrugated fine structures are spaced apart by fields 14 which are devoid of any fine structure. It is also possible to provide certain parts of the plate only with horizontal folds or with a fine structure of some other kind. These alternative embodiments generally render a deteriorated water distribution, they may, however, be necessary, for example for production-technical reasons, or for reasons due to the assemblage of the plates or to the shape of the contact body in general.

The contact plates for cooling towers, as already mentioned, are often made of metal, plastics or impregnated cardboard, and they usually have a thickness of 0.2–0.5 mm. A fine structure is easily formed by bending flat contact plates of plastic, and preferably of thermoplastic plastic, for example polyvinyl chloride. The fine structure may be formed in plates having a flat bulging to one side, and with a plurality of spacer members 6 forming a bulging to the other side.

Figure 5:
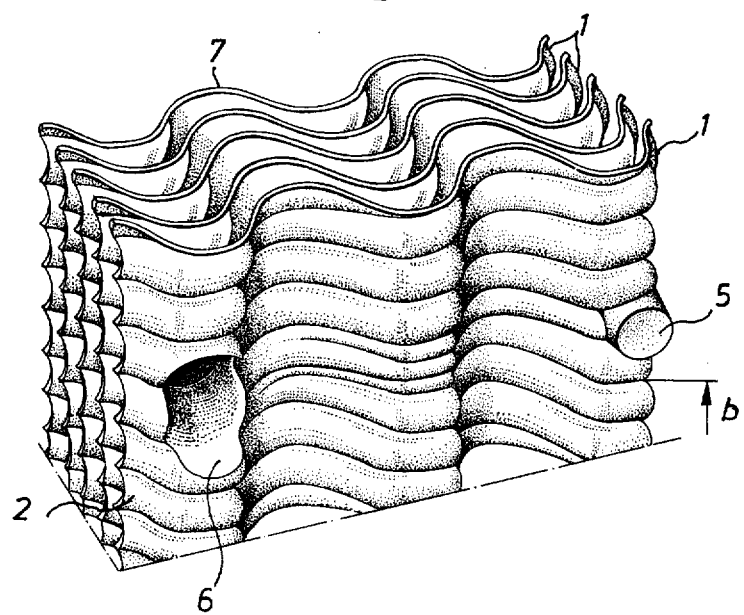
FIG. 5 shows in a perspective way how a plurality of the last-mentioned plates together form a contact body.

FIGS. 5 and 6 show a portion of a contact body 7 comprising a plurality of contact plates 1. The folds of the fine structure are indicated by 2, and the width of a field by $b$. The designations 5 and 6 refer to distance members, which are so arranged that the distance members of adjacent contact plates get into contact with each other. FIG. 6 is an example of how contact plates can be stacked one upon the other. Of course, also other alternatives of stacking or of nesting, not shown, can be imagined.

The design of the contact plates for a cooling tower as described above is adapted for use primarily in cooling towers of the countercurrent type as shown in FIG. 12. In the structure shown in FIG. 12, the cooling tower 16, enclosed by side walls 17, is supported on legs or columns 18 to permit air to flow upwardly therethrough by an axial fan 15 mounted in the upper exhaust outlet 19 and driven as indicated at 23. The fan is mounted above a draft eliminator 24 which has a spray nozzle bank on its underside fed from a water supply 25. The nozzle bank sprays water onto the top of the contact body 7 (described above) and causes the water to flow downwardly therethrough countercurrent to the air flow. At the bottom, the water discharged from the contact body is collected in the gasin 29 for discharge, recirculation, or reuse as desired.

The principle proper, is also applicable also in crosscurrent towers and air humidifiers, if at the choice of the inclination angle for the folds of the fine structure consideration is paid to the fact that the flow direction of the water is affected by the air flow entering from the side.

We claim:

1. A contact body for water and air, comprising a plurality of contact plates, which stand vertically in parallel and are provided with folds or corrugations constituting a so-called fine structure with a fold height of 1 to 5 mm and a wave length of the folds below 12 mm, characterized in that each contact plate shows a plurality of fine-structured fields both along its extension in the horizontal direction and along its extension in vertical direction, in each field the folds being parallel relative to each other, the folds for two adjacent fine-structured fields both horizontally and vertically having opposite inclination to the vertical plane, the folds in said fields forming an angle to the vertical plane of between 65° and 88° for obtaining a good adhesion and favorable distribution of the water thereby that the surface tension force acting upon the liquid agrees in magnitude closely with the gravity force acting on the liquid.

2. A contact body according to claim 1 characterized in that the extension of the field in vertical direction is between 20 and 50 mm.

3. A contact body according to claim 1, characterized in that the folds of the fine structure are substantially of sinusoidal shape.

4. A contact body according to claim 3, characterized in that the height of the sinusoidal-shaped folds is between 2 and 3 mm, their wave length is 6 to 8 mm, and their angle of inclination to the vertical plane is 75° to 85°.

5. A contact body according to claim 1, characterized in that the fine structure folds have triangular shape.

6. A contact body according to claim 1, characterized in that the fine structure folds have trapezoidal shape.

7. A contact body according to claim 1, characterized in that the fine structure is in the form of flat contact plates bent into folds.

8. A contact body according to claim 1, characterized in that the fine structure is applied on contact plates having a base structure consisting of corrugations of a size greater than the folds of the fine structure.

9. A contact body according to claim 8, characterized in that the height of the corrugations on the base structure is 10 to 30 mm.

10. A contact body according to claim 1, characterized in that the contact bodies are made of plates of a thermoplastic plastic.

11. A contact body according to claim 1, characterized in that each contact plate is provided with spacer members constituting an integral part of the plate.

* * * * *